3,259,550
PRODUCTION OF NEURAMINIDASE
Maurice Stacey, Sydney Alan Barker, Grace Irene Pardoe, and Jack Welsby Hopton, Birmingham, England, assignors to National Research Development Corporation, London, England, a corporation of Great Britain
No Drawing. Filed Dec. 17, 1963, Ser. No. 331,134
Claims priority, application Great Britain, Dec. 21, 1962, 48,340/62; July 26, 1963, 29,641/63
13 Claims. (Cl. 195—66)

This invention relates to the preparation of neuraminidases.

Neuraminidases are carbohydrase enzymes which split neuraminic acid derivatives from certain substances and their present method of production involves the interaction of influenza virus or *Vibrio cholerae* with a neuraminidase inducing substance. Neuraminidases are costly to prepare by existing methods and it is a disadvantage of such methods that they depend on the use of pathogens. Neuraminidase is known to have an action upon biological substances and it has been shown to be capable of inhibiting the development of leukemia and preventing metastases in experimental animals. It is also known to alter the biological activity of certain hormones. It is therefore useful for the purpose of medical research.

It has now been found that certain non-pathogenic organisms may be utilised to produce neuraminidase and, according to this invention, the enzyme is prepared by cultivating *Klebsiella aerogenes* (NCIB 9479) (ATCC 15328), *Bacillus palustris* (NCIB 9480) (ATCC 15329), or *Rhodopseudomonas palustris* (NCIB 8252) (ATCC 11168) in a suitable growth medium and in the presence of a neuraminidase-inducing substance.

Of the strains of organism mentioned above, *K. aerogenes* is highly preferred for many reasons especially because it permits the invention to be practised in the absence of light in contrast to *Rhodopseudomonas palustris*. The reference numbers quoted above are those of the National Collection of Industrial Bacteria in the United Kingdom and the organisms are also being deposited with the American Type Culture Collection.

Various growth media are available for the culture of the organisms and it is important to note that the actual growth must take place in presence of the neuraminidase-inducing substance (inducer) in order to achieve a significant yield of enzyme. Consequently, in addition to the mineral salts which are necessary, the medium must contain suitable sources of carbon and nitrogen and other growth factors. In some cases, the inducer can itself provide some of the necessary nutrients. Various mineral salt media supplemented with amino acids and vitamins may be used as hereinafter fully described by way of example. The defined media containing mineral salts-amino acids-vitamins and succinate described in J. Biological Chemistry, 237, 3 (1962), with or without the addition of dialysable yeast extract gave good results. A mineral salt/peptone-glycerol medium, is yet another example.

The inducer substance is usually a complex biological material which is characterised by the presence of the residue of a neuraminic acid derivative as a non-reducing end group attached to an appropriate position in the complex molecule. In the case of carbohydrates, for example, 3'-neuramin-lactose is a good inducer whereas 6' neuramin-lactose is not to be recommended, this kind of specificity being quite common in enzymology. Suitable inducers are to be found amongst the carbohydrates, mucoproteins, hormones, and mucolipids containing bound neuraminic acid derivatives such as those compounds having acyl groups attached to nitrogen or oxygen atoms in the neuraminic acid molecule, e.g., acetyl and glycollyl groups. Other suitable substances are, for example, neuraminic acid derivatives of lactose, and other carbohydrates present in colostrum, sialomucopolysaccharides, $\alpha^1$-glycoprotein and other glycoproteins present in sera, orosomucoid and other glycoproteins present in urine, mucoproteins present in mucus, gastric juice, saliva, sputum, pleural, ascitic and other fluids, gangliosides and other mucolipids present in brain, spleen, liver or erythrocytes as well as the follicular-stimulating hormone and other hormones. Substances obtained from bacteria which will cause the formation of neuraminidases include sialomucopolysaccharides, mucoproteins and mucolipids. A convenient source of the inducer is a crude dialysate of cow colostrum.

In carrying the invention into effect, a subculture of the stock organism, e.g., on agar slopes is prepared in liquid medium and, usually after a second subculture, is used to inoculate the induction medium the inducer being then added. Incubation of the shaken medium is usually carried out at about 37° C. overnight, e.g., 17–24 hours care being taken to avoid frothing of the culure and to control the pH in the range 5–7.5, preferably 5.6–6.9, for best results. Under these conditions neuraminidase activity develops in the medium and in some cases the inducer is acted upon by the enzyme to liberate some or all of its bound neuraminic acid derivative, usually N-acetyl-neuraminic acid. In general it is desirable to terminate the reaction when neuraminidase production has reached a maximum since otherwise other enzymes, e.g., aldolases, are also induced and interfere with the product recovered.

To recover the enzyme, the cultures are centrifuged in the cold and the supernatant liquid is diluted and dialysed against changes of a suitable buffer through a suitable membrane, e.g., a "Visking" (trademark) membrane in the cold for periods up to about 3 days as convenient. Neuraminidase remains in the non-dialysable fraction and after optional further purification this is lyophilised to give a product which can be stored at 2° C. for long periods without loss of activity. Solutions of the product are stable up to at least 72 hours at 2° C. at pH 6.0–7.0. The lyophilised product is stable up to at least 7 days at room temperature. To reduce dialysis volumes a preliminary ammonium sulphate precipitation to concentrate the culture fluid is advisable.

Typical products according to the invention when tested against N-acetyl-neuramin lactose in excess in presence of $10^{-3}$ M calcium chloride will cleave 0.018 mg. N-acetyl-neuraminic acid per mg. protein of product per ml. of incubation mixture per minute at 37° and pH 5.6. Considerable improvement in enzyme activity can be attained by ammonium sulphate precipitation.

The method of assay used for neuraminic acid derivatives is that of L. Warren (J. Biol. Chem., 234 (1959) 1971). In this assay, the neuraminic acid derivative is oxidised at room temperature for 20 minutes with an excess of sodium periodate dissolved in a concentrated phosphoric acid solution. The oxidation is arrested by the addition of sodium arsenite and the characteristic chromophore developed by reacting the oxidation product with a solution of thiobarbituric acid. The red chromophore is quantitatively extracted with cyclohexanone and the characteristic absorption at 549 m$\mu$ determined using a Unican SP 500 spectophotometer and cuvettes of 1 cm. light-path.

The following examples illustrate the invention:

The *K. aerogenes* used is strain NCIB·9479.

Neuraminidase buffer pH 5.5 referred to in the examples is prepared by taking per 100 ml. aqueous solution, 0.5 M sodium acetate (10 ml.), 0.5 M acetic acid (2 ml.), 0.5 M calcium chloride (1.8 ml.) and 0.5 M sodium chloride (30 ml.) and adjusting to pH 5.5 with acetic acid.

Reference is also made to media Nos. 1 and 2 whose composition is given fully in Example 1. Temperatures are expressed in ° C.

*Example 1*

A subculture of *K. aerogenes* is made from an agar slope into sterile growth medium (25 ml.) in a 250 ml. Erlenmeyer flask. Either of the two following media may be used composition being given in grams per 100 ml.

|  | 1 | 2 |
|---|---|---|
| Peptone Dialysables |  | 0.5. |
| Glycerol |  | 1.0. |
| Succinate (as acid) | 0.6 |  |
| $KH_2PO_4$ | 0.47 | 0.47. |
| $MgSO_4 \cdot 7H_2O$ | 0.02 | 0.02. |
| $(NH_4)_2SO_4$ | 0.2 |  |
| $FeSO_4 \cdot 7H_2O$ | 0.0005 | 0.0005. |
| $CaCl_2 \cdot 2H_2O$ | 0.001 | 0.001. |
| L-glutamic acid | 0.05 | 0.05. |
| Glycine | 0.01 | 0.01. |
| Vitamin Mixture,[1] 1 ml. | 2 |  |
| Yeast extract dialysables [2] | 0.1 | pH 6.3 (with KOH). |
| pH 5.8-6.0 (with KOH) |  | Sterilised, 10 lbs./20 min. |

[1] Contents/ml.  
  Biotin, 10 μg.  
  Thiamine, 1 mg. } Seitz filtered; added after autoclaving. { Dispensed 25 ml./250 ml. flasks.  
  Nicotinic Acid, 1 mg.  
  p-aminobenzoic acid, 1 mg.  
Sterilised _____ 15 lbs./15 min.  
Dispensed _____ 25 ml./250 ml. flasks.

[2] In initial growth medium omitted from induction medium.

The culture is incubated shaken at 37° for 17–24 hours. A second transfer is made by taking this culture (1 ml.) into sterile medium (25 ml.) of the same composition as above and incubating shaken overnight (17–24 hours. The second subculture is used as inoculum and is added to the induction medium, which has the composition given above except that the yeast extract is omitted, followed by the inducer, colostrum dialysable (prepared as described in Example 7), which is added as a 3% solution (Seitz-filtered). The proportions are medium (25 ml.), inoculum (4 ml.), inducer (1 ml.).

The flasks are incubated while slowly shaken for 12–17 hours, a further volume of inducer being added after 10–12 hours to maintain neuraminidase synthesis and inhibit aldolase synthesis.

The cultures are then centrifuged chilled for 30–40 minutes and supernatants transferred and dialysed, Seitz-filtering either before or after dialysis. Dialysis is at 2° and for periods of 24–72 hours and against 0.02 M-acetate buffer pH 6.0 containing calcium chloride ($10^{-6}$ M.) The volume ratio is 1:10 with two successive amounts of buffer.

The non-dialysable fraction is Seitz-filtered and lyophilised. If desired, further dialysis of the partly lyophilised material may be effected in order to remove excess sodium acetate and improve the appearance of the product. Alternatively most of the enzyme activity can be precipitated at 2° with ammonium sulphate between 55% and 70% saturation.

*Example 2*

Washed succinate-cultured cells of *Klebsiella aerogenes* are resuspended in sterile fresh culture medium (5 ml., pH 6 adjusted with potassium hydroxide) containing per litre succinic acid (6 g.), ammonium sulphate (0.015 mole), magnesium sulphate (0.001 mole) and potassium hydrogen phosphate (0.02 mole) and added to orosomucoid (5 mg.) in a sterile flask (25 ml.). The culture is incubated, shaken at 35°. 100% of the N-acetylneuraminic acid present in the orosomucoid is liberated after 17 hours. During this period, none of the N-acetylneuraminic acid produced is further degraded, and no other carbohydrase enzyme is induced by the orosomucoid. The culture is then centrifuged to remove the cells and the neuraminidase isolated from the supernatant by dialysis and subsequent fractionation with ammonium sulphate or other device.

*Example 3*

*K. aerogenes* is grown twice in medium I, Example 1, at 37° for 24 hours in shake culture. A third transfer into medium I without yeast extract pH 5.5 is made and the organism grown up at 37° overnight. The culture so obtained is used as the induction culture.

Colominic acid (5.2 mg.) dissolved in sterile medium I (no yeast extract) (2.5 ml.) is filtered aseptically (micro-Seitz) and the filtrate (2 ml.) is incubated with shaking at 37° C. with the induction culture (2 ml.) in a 50 ml. conical flask. Neuraminidase activity develops in the culture medium after about 24 hours but very little of the colominic acid is degraded by the enzyme produced. The culture is diluted with neuraminidase buffer and dialysed against the buffer at 2° for 24 hours and the non-dialysable fraction is lyophilised. The latter exhibits activity by cleaving N-acetyl neuraminic acid from orosomucoid and the sialooligosaccharides of Ayrshire colostrum.

*Example 4*

A small quantity of Tay-Sachs cerebral ganglioside is dissolved in medium I (omitting yeast extract) pH 5.5 (1.8 ml.) and after micro-Seitz filtration the filtrate (1.2 ml) is added to the induction culture (1.3 ml.) of *K. aerogenes* prepared as described in Example 3. The mixture is incubated shaken in a 25 ml. flask for 17 hours and then diluted with neuraminidase buffer and dialysed as described in Example 3. The non-dialysable fraction contains a neuraminidase which cleaves orosomucoid and colostrum dialysables.

*Example 5*

An induction culture of *K. aerogenes* is prepared as described in Example 3.

3′-lactaminoyl lactose (3.8 mg.) dissolved in medium I (omitting yeast extract) pH 5.5 (2 ml) is filtered (micro-Seitz) and the filtrate mixed with induction culture (2 mls.) in a sterile 10 ml. flask. After 17 hours incubation shaken at 37° the culture is centrifuged and the supernatant filtered through micro-Seitz. The filtrate is dialysed against neuraminidase buffer (30 ml.) at 2° for 24 hours and the non-dialysable fraction is lyophilised. It has similar neuraminidase activity to the product of Example 4.

*Example 6*

Horse-dander allergen (3.6 mg.) dissolved in medium I (omitting yeast extract) pH 5.5 (3 ml.) is filtered (micro-Seitz) and added to an induction culture (2.5 ml.) of washed *K. aerogenes* cells pre-induced by exposure to 3′-lactaminoyl lactose. The mixture is incubated shaken in a 50 ml. flask for 24 hours at 37°. The cells are removed by centrifuging and the supernatant micro-Seitz filtered and then dialysed against neuraminidase buffer pH 5.5 (10 vols.) at 2° for 24 hours. The non-dialysable fraction contains active neuraminidase. The dialysable fraction contained inter alia N-glycollyl neuraminic acid.

*Example 7*

(a) *Preparation of defatted colostrum.*—Colostrum bulked from the first two milkings after calving of Ayrshire cows and containing 4% fat, 16.4% solids not fat is employed. The material is chilled at 2° overnight and the liquid siphoned from the solid fat.

The liquid (500 mls.) is dialysed with two successive amounts (2 x 5 litres) of distilled water at 2° for 24 hours and the entire dialysable fraction is lyophilised (yield 1.8 gm. moist) to give a product which is used as inducer. The inducer (50 mg.) is added to medium I (25 ml.) omitting yeast extract pH 5.5 and Seitz filtered into a sterile 250 ml. flask.

K. aerogenes is grown twice overnight on medium I (25 mls.) and the cells harvested by centrifugation, washed with sterile distilled water, respun, and finally suspended in sterile distilled water (2.5 ml.). This suspension (1 ml.) is used as inoculum and added to the inducer in medium described above. The inoculated flasks are shaken at 37° for 17–24 hours.

The culture is then centrifuged, the supernatant Seitz filtered and the filtrate dialysed against neuraminidase buffer pH 5.5 (10 vols.) at 2° for 24 hours, the non-dialysable fraction being recovered. The product exhibits neuraminidase activity with orosomucoid and colostrum dialysables.

*Example 8*

K. aerogenes is twice grown in a peptone medium of the following composition per 100 ml.

|  | G. |
|---|---|
| Lab lemco | 1 |
| Bact. peptone | 1 |
| NaCl | 0.5 |
| Difco yeast extract | 0.1 |

The second transfer is to 25 ml. of medium and the cells are harvested as described in Example 7.

Colostrum dialysable inducer prepared as described in Example 7 is inoculated (1 ml.) into sterile medium of composition per 100 ml.

|  | G. |
|---|---|
| NaCl | 0.9 |
| $KH_2PO_4$ | 0.68 |
| $CaCl_2$ | 0.11 |
| Bact. peptone | 1 |
| $MgSO_4$ | 0.01 |
| $(NH_4)_2SO_4$ | 0.2 |
| pH | 5.5 |

The flasks are incubated shaken at 37° for 24 hours after which the medium exhibits neuraminidase activity.

*Example 9*

K. aerogenes is grown twice in medium I at 37° for 24 hours in shake culture and the cells harvested by centrifuging, washed with sterile distilled water (5 ml.), respun, and resuspended in distilled water (2.5 ml.). Orosomucoid (4 mg.) is dissolved in distilled water (3 ml.) and micro-Seitz filtered.

Two media are used (1) succinate mineral salts medium containing in grams per 100 ml.:

| | |
|---|---|
| $(NH_4)SO_4$ | 0.2 |
| $MgSO_4.7H_2O$ | 0.02 |
| $KH_2PO_4$ | 0.47 |
| Succinate (as acid) | 0.6 |

Adjusted to pH 5.5 with KOH.

(2) Medium I omitting yeast extract dialysables both prepared at pH 5.5 at 1.33 times the normal strength and sterilised by autoclaving. Media (1.5 ml.) and orosomucoid solution (0.5 ml.) are transferred together into 20 ml. centrifuge tubes and inoculated with cell suspension (0.1 ml.). The tubes are incubated shaken at 37° for 17–24 hours.

The cultures are then diluted with neuraminidase buffer (1.5 ml.) centrifuged, and the supernatents filtered (micro-Seitz) and dialysed against the same buffer (10 vols.) at 2° for 24 hours. The non-dialysable fraction is lyophilised and exhibits neuraminodase activity. The preparation obtained using medium I is more active than that obtained with succinate medium.

*Example 10*

The procedure of Example 9 is followed using B. palustris NCIB 9480 instead of K. aerogenes. In this case the medium I only is used for the incubation in the presence of orosomucoid. Neuraminidase activity is again obtained.

*Example 11*

R. palustris NCIB 8252 is grown in medium I (25 ml.) in shake incubation at 37° for 5 days and a heavy inoculum is used for a second transfer into the same medium (25 ml.). The second culture is shaken at 37° for three days and the cells are harvested by centrifuging, washing with sterile distilled water (5 ml.) and resuspension in sterile distilled water (1 ml.). This inoculum (0.2 ml.) is added to medium I omitting yeast extract but containing orosomucoid prepared as described in Example 9 and is incubated shaken at 37° for 48 hours. The culture is subsequently treated as described in Example 9 to recover neuraminidase-active material.

We claim:

1. A process for the preparation of a neuraminidase which comprises cultivating a non-pathogenic aerobic organism selected from the group consisting of Klebsiella aerogenes (Strain ATCC No. 15328), Bacillus palustris (Strain ATCC No. 25329), and Rhodopseudomonas palustris (Strain ATCC No. 11168), in a growth medium therefor and in the presence of a neuraminidase-inducing substance containing a bound neuraminic acid derivative in the form of a non-reducing end group.

2. A process according to claim 1, in which the neuraminidase-inducing substance is cow colostrum dialysate.

3. A process according to claim 1, in which the neuraminidase-inducing substance is orosomucoid, colominic acid, or 3′-neuramin-lactose.

4. A process according to claim 1, in which the growth medium contains succinate, amino acids, vitamins, ammonium and mineral salts.

5. A process according to claim 1, in which the growth medium contains peptone, glycerol, amino acids, and mineral salts.

6. A process according to claim 1, in which the pH of the medium is controlled at from 5 to 7.5.

7. A process according to claim 6, in which the pH is controlled at from 5.6 to 6.9.

8. A process according to claim 1, in which the cells are separated from the culture medium at the end of incubation and a neuraminidase-containing product is recovered from said medium.

9. A process according to claim 8, in which the cell-free medium is purified by dialysis prior to recovery of said product.

10. A process according to claim 9, in which prior to dialysis the culture fluid is concentrated by ammonium sulphate precipitation and the precipitate is re-dissolved in a relatively small volume of solvent for the dialysis.

11. A process according to claim 9, in which the non-dialysable fraction is lyophilized to produce a concentrate containing the enzyme.

12. The process which comprises subculturing K. aerogenes (Strain ATCC 15328), Bacillus palustris (Strain ATCC 15329), or Rhodopseudomonas palustris (Strain ATCC 11168), to produce a sub-culture thereof, inoculating a growth medium with said sub-culture, and incubating the growing culture in the presence of cow colostrum dialysable material at pH 5–7.5 for a period of at least 12 hours until substantial neuraminidase activity is established in the medium, separating the cells from said medium, recovering a neuraminidase concentrate from the cell-free medium, and lyophilizing said concentrate.

13. In a biological process for the preparation of a neuraminidase, the improvement which comprises cultivating a non-pathogenic aerobic organism selected from the group consisting of *Klebsiella aerogenes* (Strain ATCC No. 15328), *Bacillus palustris* (Strain ATCC No. 25329), and *Rhodopseudomonas palustris* (Strain ATCC No. 11168).

References Cited by the Examiner

Gottscholk, The Enzymes, vol. 4, 1960, pages 461–473, Academic Press, New York.

Journal of General Microbiology, 21, 550–568 (1959).

Torriani et al., Journal of Biological Chemistry, vol. 237, No. 1, January 1962, pages 3–13.

A. LOUIS MONACELL, *Primary Examiner.*

L. M. SHAPIRO, *Assistant Examiner.*